United States Patent Office 3,502,629
Patented Mar. 24, 1970

3,502,629
PROCESS FOR POLYMERIZING CHLOROPRENE IN THE PRESENCE OF A HINDERED PHENOL
Richard John Strachan Matthews, Surrey, England, assignor to BP Chemicals (U.K.) Limited, London, England, a British company
No Drawing. Continuation-in-part of application Ser. No. 387,771, Aug. 5, 1964. This application Feb. 19, 1968, Ser. No. 706,684
Claims priority, application Great Britain, Aug. 24, 1963, 33,612/63
Int. Cl. C08f 3/20; C08d 3/14
U.S. Cl. 260—92.3       7 Claims

ABSTRACT OF THE DISCLOSURE

A method for the manufacture of polychloroprene wherein chloroprene monomer containing an alkali soluble aromatic hydroxy compound capable of inhibiting polymerisation and oxidation of the monomer is treated with an aqueous alkali to remove the aromatic hydroxy compound and polymerised in the presence of a catalytically effective amount of peroxy compound characterized in that the monomer throughout the treatment with alkali and the polymerisation contains a hindered phenol. The presence of the hindered phenol protects the monomer against premature polymerisation and acts as an oxidation inhibitor throughout the polymerisation process.

---

This application is a continuation-in-part of application Ser. No. 387,771, filed Aug. 5, 1964, now abandoned.

This invention relates to an improved process for the polymerisation or copolymerisation of chloropren (2-chloro-1,3-butadiene) in the presence of peroxide compounds as polymerisation initiators and it relates further to the polychloroprene formed by this process.

Chloroprene monomer readily autoxidises to form compounds which can and frequently do initiate uncontrolled polymerisation of the monomer both in the presence and absence of peroxide compounds commonly used as polymerisation initiators. In consequence it is customary to protect the monomer by adding oxidation inhibitors such as aromatic hydroxy compounds and amino compounds or their derivatives. Some examples of these compounds are tertiary butyl catechol, phenothiazine and alkylated diphenyl amines.

Chloroprene stabilised with these oxidation inhibitors cannot be polymerised using the quantities of peroxide compounds normally employed as polymerisation initiators. It is customary therefore to remove these oxidation inhibitors by various processes such as, for example, washing the monomer with an aqueous alkali prior to preparing the monomer for polymerisation. The monomer is in consequence not protected against autoxidation either during these preparatory stages or during the polymerisation with the result that a certain amount of premature polymerisation occurs and the polymerisation process itself is difficult to control.

It is an object of the present invention to provide a process for the polymerisation or copolymerisation of chloroprene using a monomeric material which has been adequately protected against premature polymerisation and further to provide a process in which an oxidation inhibitor is present throughout the polymerisation and which does not require the use of an excess quantity of peroxide polymerisation initiator.

The process of the present invention is based on the discovery that when a chloroprene monomer is polymerised using a polymerisation initiating peroxide compound, protection against premature and uncontrolled polymerisation is achieved by providing in admixture with the chloroprene a quantity of a compound from a certain class of hindered phenols, and conducting the polymerisation of the chloroprene in the presence of said compound.

The hindered phenols referred to are phenols carrying a t-butyl group in each of the two positions ortho to the phenolic hydroxy group, as depicted in the following formula:

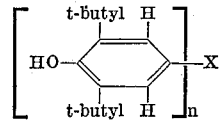

wherein $n$ is a whole number corresponding to the valency of X and X is alkyl, aminoalkyl, alkoxyalkyl, haloalkyl, aralkyl, aryl, alkaryl, alkoxyaryl, aminoaryl, haloaryl, carboxyaryl, and carboxyalkyl, and esters thereof, or cycloaliphatic. Substituents on these groups known to affect radical polymerisation such as nitro and non-hindered phenolic groups, should be avoided.

The alkyl groups are typified by lower alkyl having up to 8 carbon atoms, especially methyl, ethyl, n-propyl, isopropyl, n-butyl, t-butyl and the like; substituted alkyl such as aminoalkyl and especially aminomethyl, dimethylaminomethyl and the like, alkoxy alkyl such as methoxymethyl, ethoxymethyl and the like, and aralkyl such as benzyl and substituted benzyl groups such as 4-hydroxy 3,5-ditertiary-butyl benzyl; aryl groups such as naphthyl and phenyl and substituted phenyl such as:

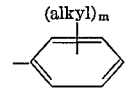

wherein $n$ is 1 or 2 and especially 4-t-butyl phenyl; 4-hydroxy 3,5-ditert. butyl phenyl; cyclohexyl and cyclopentyl radicals are illustrative of the cycloaliphatic groups.

Examples of hindered phenols represented by the foregoing formula are 2,6-ditertiary-butyl-4-methyl phenol,
2,6-ditertiary-butyl-4-phenyl phenol,
4,4'-methylene bis(2,6-ditertiary butyl phenol),
2,6-ditertiary-butyl-4 (4-tertiary-butyl phenyl) phenol,
2,4,6-tris (3,5-ditertiary-butyl-4-hydroxy benzyl) mesitylene,
2,6-ditertiary-butyl-alpha-dimethyl amino-p-cresol,
2,6-ditertiary-butyl-alpha-methoxy-p-cresol,
4,4' bis (2,6-ditertiary butyl phenol),
2,6-ditertiary-butyl-4-cyclo-hexyl phenol, and
the like or substituted derivatives thereof.

This process is suitable for the preparation of both sulphur modified and mercaptan modified polychloroprene. Any peroxide compound normally employed in the art as polymerisation initiator in catalytically effective amounts for the polymerisation of chloroprene is suitable for use in the present process. Organic peroxides such as peracetic acid, benzyl peroxide and the like may be used. The preferred peroxide compounds are inorganic water soluble persulphates such as, for example, the ammonium or alkali metal persulphates. They may be used in quantities normally employed for initiating polymerisation. A suitable range is from 0.001 to 0.5 percent. The chloroprene polymerisation can additionally be carried out in the presence of another monomer containing ethylenic unsaturation capable of undergoing addition of polymerisation with 2-chloro-1,3-butadiene. Suitable results are obtained with up to 20 percent by weight of the entire monomer system being the copolymerisable monomer. Some examples are styrene, acrylonitrile and 2,3-dichloro-1,3-butadiene.

The preferred proportion by weight of hindered phenol to the weight of chloroprene monomer (including any copolymerisable monomer) is in the range 0.001 percent to 1.0 percent.

The hindered phenol can be added at any stage to the monomer prior to the commencement of polymerisation, to prevent autoxidation and it is preferred to add it to the stored monomer before preparing it for polymerisation. Other oxidation and polymerisation inhibitors as heretofore used in the art and as mentioned hereinabove such as for example tertiary butyl catechol can be present in the stored chloroprene to give additional protection in addition to the hindered phenols containing a tertiary butyl group in each ortho position to each phenolic hydroxyl group. These additional oxidation and polymerisation inhibitors must be removed from the chloroprene when preparing it for polymerisation. One method of removing some of these additional inhibitors is by washing the chloroprene with an aqueous alkali such as for example dilute aqueous sodium hydroxide solution. The hindered phenol is not removed by this washing process and the chloroprene is thus protected against autoxidation and premature polymerisation during these preparatory stages.

In the present invention the chloroprene can be protected against autoxidation at all stages both before and during polymerisation. The molecular weight of the polymer or copolymer formed is unaffected by the presence of hindered phenols during polymerisation. Furthermore, the polymerisation process can be carried out without the use of the excess quantities of peroxide polymerisation initiator which are required if oxidation and polymerisation inhibitors other than hindered phenols are present in the chloroprene. The rubber so formed shows storage properties superior to those of rubbers prepared in the presence of other inhibitors which require the use of excess quantities of peroxide polymerisation initiator; for instance the increase in Mooney viscosity of the rubber on storage at 70° C. for 14 days is very small. In addition the presence of residual quantities of hindered phenol in the rubber formed by carrying out the present process acts as a stabiliser and improves the product.

The product according to the present invention is illustrated by the following example.

EXAMPLE 1,300 lbs. chloroprene monomer which had been protected against autoxidation during storage by the presence of 0.2 percent by weight of tertiary-butyl-catechol together with 0.5 percent by weight of 2,6-ditertiary-butyl-4-methyl-phenol was prepared for polymerisation by washing with dilute aqueous sodium hydroxide solution to remove the tertiary butyl catechol and then emulsified in a 500 gallon reactor for 1½ hours at a temperature of 40° C. with 1,950 lbs. water in the presence of 72 lbs. sodium salt of a disproportionated rosin acid supplied as a 72 percent paste with water by the Hercules Powder Company (Dresinate 731—a registered trademark), 9.1 lbs. of the sodium salt of formaldehyde-naphthalene sulphonic acid condensate product, 5.2 lbs. trisodium phosphate and 3.0 lbs. of n-dodecyl mercaptan. There was no polymerisation of the monomer during this preparatory stage. The emulsified monomer was then polymerised using a total of 0.125 lb. ammonium persulphate in conjunction with 0.45 lb. sodium dithionite as the polymerisation initiator; 70 percent by weight of the chloroprene monomer was converted into polymer after 4 hours 10 minutes.

The Mooney viscosity of the rubber obtained, only increased from 42 to 45 when maintained at 70° C. for 10 days.

By way of comparison, chloroprene monomer which had been protected against autoxidation during storage by the presence of 0.2 percent by weight of tertiary-butyl-catechol only was prepared for polymerisation by washing in dilute aqueous sodium hydroxide and then emulsified in the same way as previously described. The polymerisation was not controllable and during a 1½ hour warming up period to 40° C., before addition of the polymerisation initiator, the monomer had polymerised to the extent of 24 percent by weight.

Further, by way of comparison the polymerisation process of the example was repeated on a sample of chloroprene containing 0.02% by weight of tertiary butyl catechol. In order to obtain approximately 70% conversion of chloroprene to polymer in 4 hours, 3.12 lbs. of ammonium persulphate had to be used. The Mooney viscosity of the resultant rubber increased from 42 to 73 when it was maintained at 70° C. for 10 days.

Substantially similar improved results can be obtained when chloroprene is polymerised in aqueous emulsion in the presence of any of the many known free radical polymerisation initiator systems for chloroprene. Similar improvements are also obtained in the production of copolymers formed from chloroprene and minor proportions of any of the other monmers with which it is known that chloroprene will copolymerise.

I claim:

1. In the process of the aqueous polymerisation of chloroprene monomers wherein the polymerisation is initiated by catalytically effective amounts of a peroxy compound, the improvement which comprises contacting the chloroprene monomers with an effective amount of a hindered phenol and conducting the polymerisation in the presence of said hindered phenol, said phenol having the formula:

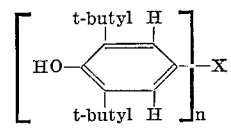

wherein $n$ is a whole number corresponding to the valency of X and X is alkyl, aminoalkyl, alkoxyalkyl, haloalkyl, aralkyl, aryl, alkaryl, alkoxyaryl, aminoaryl, haloaryl, carboxyaryl, and carboxyalkyl, and esters thereof, or cycloaliphatic.

2. In the process of claim 1 wherein the monomer before polymerisation additionally contains an aqueous alkali soluble aromatic hydroxy compound capable of inhibiting the polymerisation of said chloroprene, the improvement which comprises treating the monomer with aqueous alkali to remove said hydroxy compound and then conducting the polymerisation.

3. The process of claim 2 wherein the hindered phenol is 2,6-ditertiary-butyl-4-methyl phenol, 4,4' - methylene bis (2,6-ditertiary butyl phenol), 2,4,6-tris (3,5-ditertiary-butyl-4-hydroxy benzyl)mesitylene, 2,6-ditertiary-butyl-alpha-dimethyl amino-p-cresol, 2,6-ditertiary-butyl-alpha-methoxy-p-cresol, or 2,6-ditertiary-butyl-4-cyclo-hexyl phenol.

4. The process of claim 3 wherein the proportion by weight of hindered phenol to the weight of chloroprene monomer is in the range 0.001% to 1.0%.

5. The process of claim 2 wherein there is additionally present together with said chloroprene monomers up to 20 percent by weight based on the entire weight of the monomers an ethylenically unsaturated monomer copolymerisable with said chloroprene.

6. The process of claim 3 wherein the peroxy initiating compound is ammonium persulphate or an alkali metal persulphate.

7. The process of claim 4 wherein the peroxy initiating compound is ammonium persulphate.

References Cited

UNITED STATES PATENTS

| 2,566,537 | 9/1951 | Schmerling. |
| 2,707,180 | 4/1955 | Maynard. |
| 2,967,851 | 1/1961 | Roos et al. |
| 2,980,656 | 4/1961 | Jones et al. |
| 2,999,842 | 9/1961 | Csendes. |

JOSEPH L. SCHOFER, Primary Examiner

WILLIAM F. HAMROCK, Assistant Examiner

U.S. Cl. X.R.

260—45.95, 814